United States Patent [19]

Ohtake

[11] Patent Number: 4,926,413
[45] Date of Patent: May 15, 1990

[54] SATELLITE COMMUNICATION SUBSYSTEM WITH THE CAPABILITY OF PERFORMING A NON-INTERFERRING OPERATIONAL TEST

[75] Inventor: Toshimichi Ohtake, Kamakura, Japan

[73] Assignee: Kabushiki Kaisha Toshiba, Kawasaki, Japan

[21] Appl. No.: 242,182

[22] Filed: Sep. 9, 1988

[30] Foreign Application Priority Data

Sep. 10, 1987 [JP] Japan .................................. 62-227323

[51] Int. Cl.[5] ............................................. H04J 3/14
[52] U.S. Cl. ................................ 370/13.1; 370/104.1; 375/3.1; 455/67
[58] Field of Search ...................... 370/104, 13, 17, 97, 370/75, 13.1; 375/3, 4, 3.1; 455/11, 12, 9, 16, 67, 98, 115; 342/352

[56] References Cited

U.S. PATENT DOCUMENTS

| | | | |
|---|---|---|---|
| 3,649,777 | 3/1972 | Matsushima | 375/3.1 |
| 3,737,782 | 6/1973 | Pierce | 455/115 |
| 4,397,018 | 8/1983 | Fennel, Jr. et al. | 370/17 |
| 4,633,459 | 12/1986 | Blackburn | 370/13 |
| 4,754,496 | 6/1988 | Fishkin et al. | 455/67 |

OTHER PUBLICATIONS

BS-2 Spacecraft Design, Toshimichi Ohtake et al., Jun. 1982, 13th ISTS, Tokyo.

Primary Examiner—Douglas W. Olms
Assistant Examiner—Min Jung
Attorney, Agent, or Firm—Oblon, Spivak, McClelland, Maier & Neustadt

[57] ABSTRACT

The frequency of the broadcasting waves transmitted from the ground broadcasting station and received by an antenna is converted to that of the satellite broadcasting wave by means of a receiving section. The satellite broadcasting wave is transmitted to the ground service area via a transmitting section, radiation selector, reception/transmission multiplexer and antenna. In a case where the new satellite which is to be used instead of the old satellite is placed under the operation test, the satellite broadcasting wave of the transmitter of the new satellite is transmitted into space in a direction other than that towards the earth or absorbed in wave absorbers under the control of the radiation selector so that the satellite broadcasting wave of the old satellite will not be interferred with the satellite broadcasting wave of the new satellite. The command wave from the satellite control station is received by a command reception and telemetry transmission unit via the antenna and reception/transmission multiplexer and processed therein. Then, telemetry data obtained as the result of determining the operation condition of various systems in the satellite are transmitted to the ground satellite control station via the command reception and telemetry transmission unit, reception/transmission multiplexer and antenna.

5 Claims, 4 Drawing Sheets

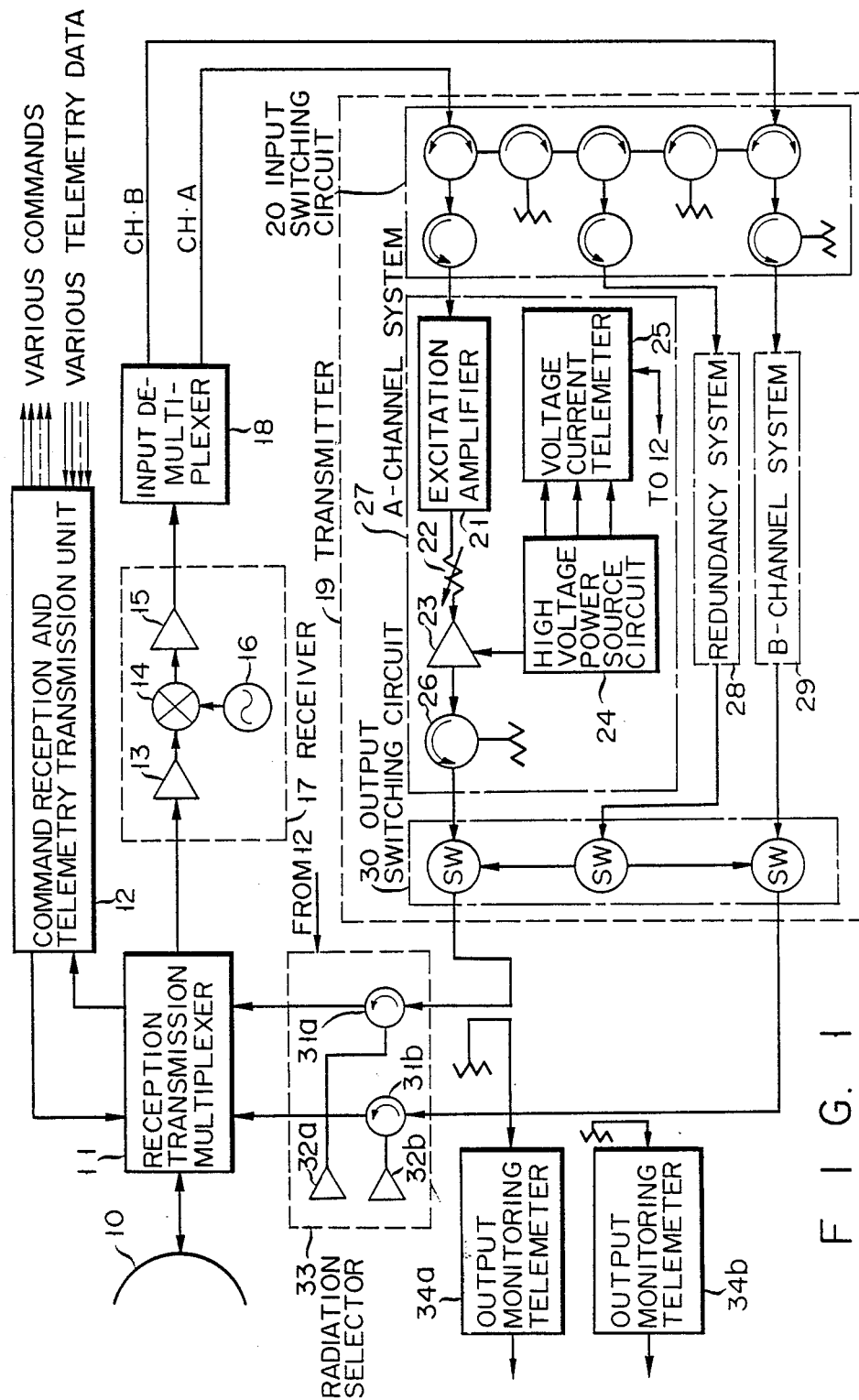
F I G. 1

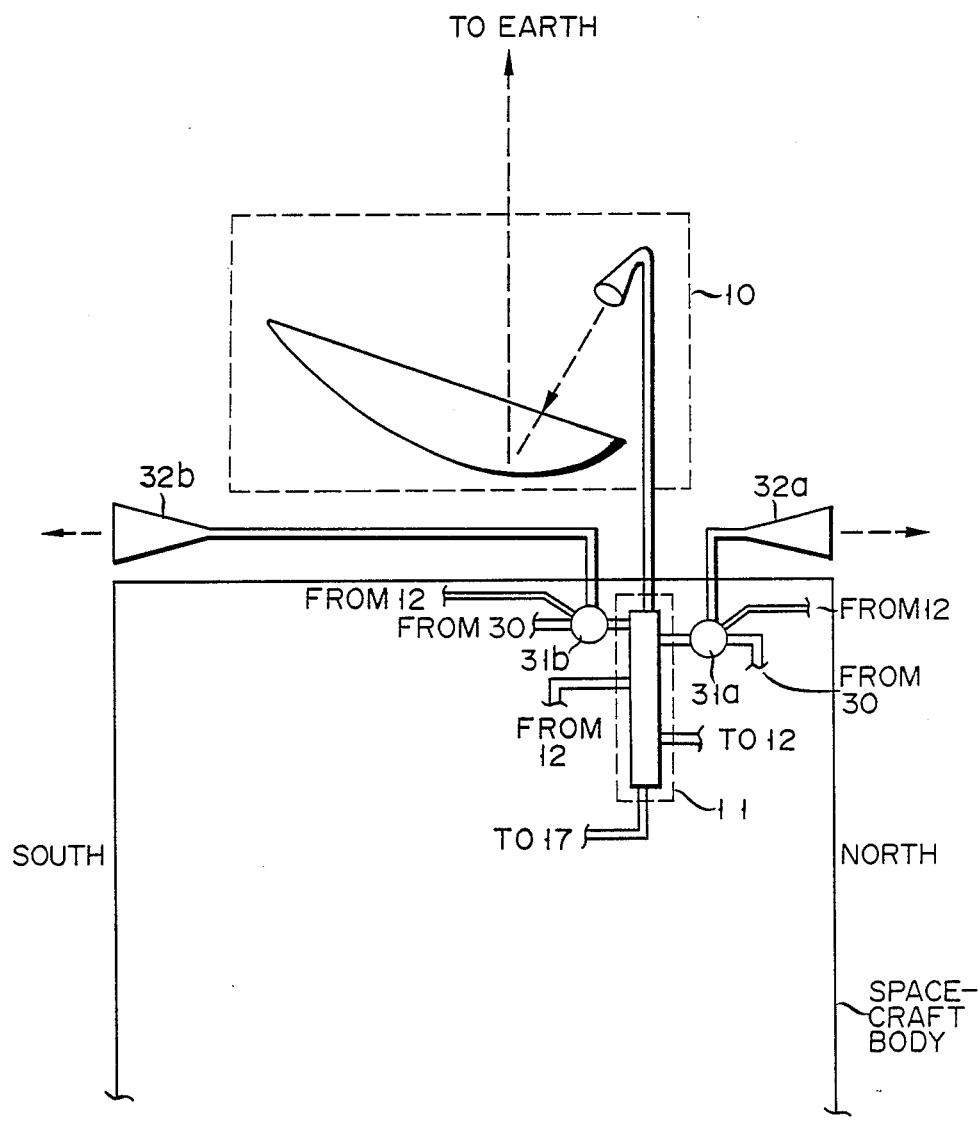
F I G. 2

4,926,413

SATELLITE COMMUNICATION SUBSYSTEM WITH THE CAPABILITY OF PERFORMING A NON-INTERFERRING OPERATIONAL TEST

BACKGROUND OF THE INVENTION

1. Field of the Invention

This invention relates to a radio wave generating device mounted on various artificial satellites including satellite-broadcasting artificial satellites (which are hereinafter referred to as broadcasting satellites), and more particularly to a communication subsystem for artificial satellites for transmitting, for example, broadcasting waves to specified service areas from space.

2. Description of the Related Art

As is well known in the art, the Japanese broadcasting satellite is controlled to station on a geostationary orbit above the equator at the 110th degree of east longitude according to the international agreement. The broadcasting satellite includes a communication subsystem for artificial satellites for receiving satellite broadcasting waves generated from earth broadcasting stations and transmitting the received wave to the service areas (mainly in Japan). The transmitting/receiving antenna of the communication subsystem is set on the broadcasting satellite to a direction of the service areas seeing from the geostationary orbit above 110th degree of east longitude.

The construction of the satellite is disclosed in, for example, the paper "PROCEEDINGS OF THE THIRTEENTH INTERNATIONAL SYMPOSIUM ON TECHNOLOGY AND SCIENCE" made public in the symposium held in Tokyo Japan, in 1982. "BS-2 SPACE CRAFT DESIGN" is disclosed in the 14th chapter (1421 to 1425) of this paper.

In a system using such a broadcasting satellite, it is sometimes necessary to replace the satellite which was previously launched and placed in orbit, by a new satellite. In this case, if the new satellite is placed in orbit and set into test operation while the old satellite is kept under operation, interference occurs between waves transmitted from the communication subsystems of the old and new satellites. In order to prevent such an interference, the new satellite is first set in a provisional orbit position which is sufficiently separated away from the old satellite and cannot been covered by the beam of the receiving antenna of the ground. Then, the operation test for instruments mounted on the new satellite including the communication subsystem is effected according to commands from the earth station.

In a case where the new satellite is set in the provisional orbit and the operation test for the onboard instruments is effected as described above, it is necessary to move the new satellite into the preset orbit after the completion of the operation test. Conventionally, it takes two weeks to one month for the new satellite to move from the provisional orbit to the preset orbit.

According to the method of replacing the broadcasting satellites, it becomes impossible to effect the sufficient test operation when rapid replacement of the satellites is required. Further, when the operation test for the new satellite is effected, it is better to set the new satellite into the running-in condition at the final orbit position and then effect the operation test. This is because the running-in condition is much similar to the actual operation condition, and a more precise test result can be obtained.

SUMMARY OF THE INVENTION

An object of this invention is to provide a communication subsystem for an artificial satellite in which the operation test for the new satellite can be effected without making the construction complex and causing the interference even when the new satellite is set near the stationary position of the old satellite.

The above object can be attained by a communication subsystem for an artificial satellite which comprises an antenna for receiving and transmitting radio waves with respect to a satellite control station, and directly or indirectly receiving service source radio waves from a broadcasting station and transmitting the satellite service radio waves to a service area; a reception/transmission multiplexer for receiving radio waves from the antenna at a first input terminal, outputting service source waves and telemetry command waves which are separated from the received radio waves from first and second output terminals, respectively, and supplying satellite service waves received at a second input terminal and telemetry waves received at a third input terminal to the antenna; a command reception and telemetry transmission unit for receiving the command wave from the second output terminal and supplying corresponding commands to controlled sections in the satellite, processing telemetry data from at least on telemeter inside the satellite to supply the telemetry wave to the third input terminal; a reception/transmission unit for receiving the service source wave from the first output terminal, converting the frequency of the service source wave and outputting the service source wave as the satellite service wave; and a selection circuit for receiving the satellite service wave from the reception/transmission unit, inhibiting the satellite service wave from being supplied to the second input terminal of the reception/transmission multiplexer in response to a broadcasting instrument test command while the command reception and telemetry transmission unit is receiving the broadcasting instrument test command, and permitting the satellite service wave to be supplied to the second input terminal of the reception/transmission multiplexer in a case where the command reception and telemetry transmission unit does not receive the broadcasting instrument test command.

BRIEF DESCRIPTION OF THE DRAWINGS

FIG. 1 is a block diagram showing one embodiment of this invention;

FIG. 2 is an illustrative view showing the arrangement of radiators and an antenna with respect to the main body of the satellite shown in FIG. 1;

DETAILED DESCRIPTION OF THE PREFERRED EMBODIMENTS

Figure 3:
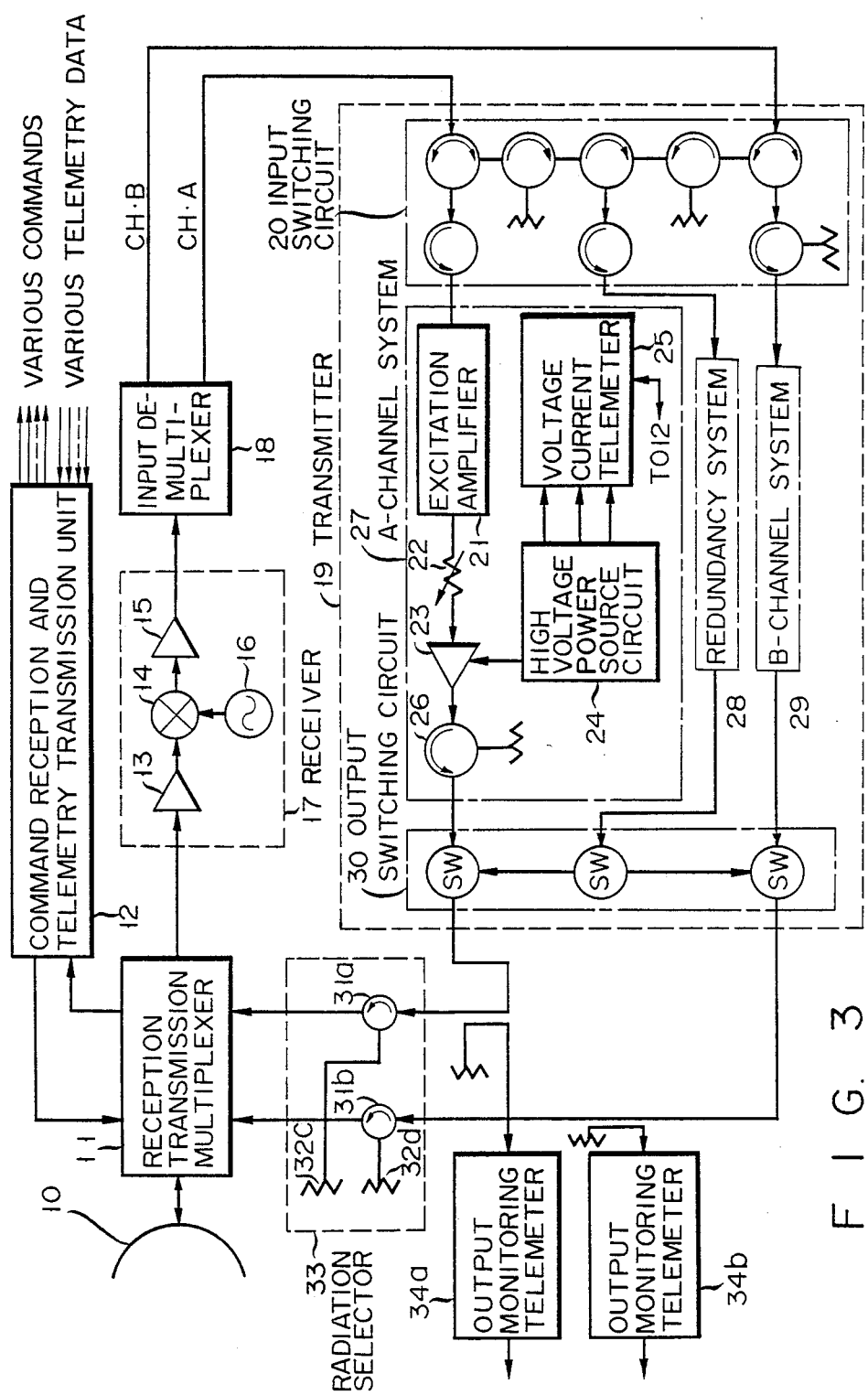
FIG. 3 is a block diagram showing another embodiment of this invention.

There will now be described embodiments of this invention with reference to the attached drawings.

In FIG. 1, 10 denotes an antenna for receiving and transmitting radio waves (including command and telemetry data) with respect to a satellite control station installed on earth, and receiving broadcasting radio waves (for example, in a frequency band of 14 GHz) from a broadcasting station and transmitting the satellite broadcasting radio waves (for example, in a frequency band of 12 GHz) to a service area.

An output of antenna 10 is supplied to a first input terminal of reception/transmission multiplexer 11. Reception/transmission multiplexer 11 drives out the broadcasting wave from the radio wave received at the first input terminal and supplies the broadcasting wave to receiver 17 via a first output terminal. Further, reception/transmission multiplexer 11 drives out the telemetry command wave from the radio wave received at the first input terminal, and supplies the command wave to command reception and telemetry transmission unit 12 via a second output terminal.

Command reception and telemetry transmission unit 12 processes and identifies the commands sent from the satellite control station, and respectively supplies the commands to the controlled sections of various control systems (such as a communication system, power source system, and attitude control system) installed inside the satellite. Further, command reception and telemetry transmission unit 12 receives telemetry data indicating the operating state and generated from the controlled sections and telemeters and permits corresponding telemetry waves to be transmitted to the satellite control station via reception/transmission multiplexer 11 and antenna 10.

Receiver 17 includes amplifier 13, mixer 14, amplifier 15 and local oscillator 16, and converts received waves of a frequency band of 14 GHz (including A-channel (13,765.84 MHz) and B-channel (13,804.20 MHz)) to the satellite broadcasting waves of a low frequency band. The satellite broadcasting waves are supplied to input demultiplexer 18 and then divided into the A- and B-channel waves. The A- and B-channel waves from input demultiplexer 18 are supplied to transmitter 19. Transmitter 19 includes input switching circuit 20, A-channel system 27, B-channel system 29, redundancy system 28 and output switching circuit 30. A-channel system 27 includes excitation amplifier 21, gain control attenuator 22, TWT (traveling-wave tube) amplifier 23, high voltage power source circuit 24, voltage-current telemeter 25 and isolator 26. Voltage-current telemeter 25 measures the voltage and current of high voltage power source circuit 24 and supplies measurement data to command reception and telemetry transmission unit 12. Redundancy system 28 and B-channel system 29 are designed to have the same construction as A-channel system 27.

Each of the channel output terminals of output switching circuit 30 is connected to radiation selector 33 which controls the operation of selecting radiation of the satellite broadcasting waves. Radiation selector 33 includes selection switch 31a and radiator 32a corresponding to the A-channel and selection switch 31b and radiator 32b corresponding to the B-channel.

Selection switches 31a and 31b are normally set to permit the satellite broadcasting waves from transmitter 19 to be supplied to the second input section of reception/transmission multiplexer 11. However, when the operation test is effected, selection switches 31a and 31b are set in response to the command received by command reception and telemetry transmission unit 12 so as to supply the satellite broadcasting waves from transmitter 19 to radiators 32a and 32b.

Further, output terminals of each channel of transmitter 19 are connected to output monitoring telemeters 34a and 34b. Telemetry data obtained by output monitoring telemeters 34a and 34b are supplied to command reception and telemetry transmission unit 12.

Radio waves are irradiated from radiators 32a and 32b of radiation selector 33 into space in predetermined directions different from the direction towards the ground service area which is placed under the charge of the satellite.

According to the communication subsystem described above, the broadcasting waves (A-channel and B-channel) received by antenna 10 are amplified by amplifier 13 of receiver 17, and mixed with a local oscillation signal of 2000 MHz, for example, by mixer 14. As a result, a signal (satellite broadcasting wave) having a frequency equal to the difference between the frequencies of the broadcasting wave and local oscillation signal is derived out from mixer 14. The output signal of mixer 14 is divided into respective channel signals (CH·A) and (CH·B) by means of input demultiplexer 18, and the channel signals (CH·A) and (CH·B) are supplied to input switching circuit 20 of transmitter 19. Input switching circuit 20 normally functions to respectively pass the channel signals (CH·A) and (CH·B) to A-channel system 27 and B-channel system 29, and can also function to pass the channel signal (CH·A) to redundancy system 28 when A-channel system 27 becomes abnormal, for example.

A-channel system 27, B-channel system 29 and redundancy system 28 have the same construction and are operated in substantially the same manner. Therefore, the operation of A-channel system 27 is explained as an example. For example, when signal (CH·A) passes through A-channel system 27, it is amplified to a higher level by excitation amplifier 21 and then supplied to gain control attenuator 22. Thus, signal (CH·A) is set to have a level suitable for an input to next stage TWT amplifier 23. TWT amplifier 23 amplifies signal (CH·A) to a maximum level of the ground transmission power and supplies the amplified signal to output switching circuit 30 via isolator 26. At the same time, voltage-current telemeter 25 of high voltage power source circuit 24 measures the voltage and current of TWT amplifier 23, and supplies telemetry data thus obtained to command reception and telemetry transmission unit 12. In this way, the satellite control station can monitor the operating condition of TWT amplifier 23 and detects the long-term hysteresis of the electrode of the TWT amplifier 23. Output switching circuit 30 supplies the satellite broadcasting wave to be transmitted to the service area to radiation selector 33. In this case, an output of output switching circuit 30 is measured by output monitoring telemeters 34a and 34b, and the measurement data is supplied to command reception and telemetry transmission unit 12.

Selection switches 31a and 31b of radiation selector 33 can selectively supply an input signal to radiators 32a and 32b or to reception/transmission multiplexer 11 in response to the selection command from the satellite control station.

According to the communication subsystem for the artificial satellite, in order to transmit the broadcasting waves to the ground or service area, selection switches 31a and 31b are so set as to pass waves from output switching circuit 30 to reception/transmission multiplexer 11. Thus, the satellite broadcasting waves are transmitted to the ground service area from antenna 10. However, when the satellite is placed under the operation test, selection switches 31a and 31b are so set as to pass waves from output switching circuit 30 to radiators 32a and 32b. Therefore, in this case, the satellite broadcasting waves are irradiated into space in a direction different from that of the earth. That is, the satellite broadcasting waves are not transmitted towards the service area of the earth. In this way, the satellite broadcasting waves transmitted from a new satellite to be used instead of the old one will not interfere with the satellite broadcasting wave which are actually used for satellite broadcasting and transmitted from the old satellite to the service area.

Various telemetry data of the new satellite set under the operation test are transmitted to the ground satellite control station via command reception and telemetry transmission unit 12 and antenna 10. In the satellite control station, it is possible to determine the operating condition of the communication subsystem by reference to the long-term hysteresis of the electrode of the TWT detected by means of voltage-current telemeter 25 and data indicating the output stability detected by means of output monitoring telemeters 34a and 34b. Further, a memory in which various normal telemetry data obtained when the ground test for the satellite was effected are stored is held in the satellite control station. Thus, the satellite control station can determine whether or not the satellite is normal by comparing the various telemetry data transmitted through space with the telemetry data stored in the memory. Since the satellite control station uses an inherent circuit for each satellite when it performs the command reception and telemetry transmission with respect to each satellite, the telemetry command waves will not be interfered with each other.

FIG. 2 shows the arrangement of antenna 10 and radiators 32a and 32b with respect to the main body of the satellite.

The satellite broadcasting waves derived out via output switching circuit 30 are supplied to selection switches 31a and 31b which in turn determine whether they are transmitted towards the earth via antenna 10 or they are irradiated by means of radiator a direction different from that of the earth (or service area). Radiators 32a and 32b may be preferably a horn antenna type in the conical or pyramid form. In FIG. 2, the wave radiation directions of radiators 32a and 32b are set perpendicularly to that of antenna 10. In general, the wave radiation directions of radiators 32a and 32b are set so that irradiated waves will not obstruct the actual broadcasting and communication service.

In the above explanation, when a new satellite is placed under the operation test, radiation selector 33 including radiators 32a and 32b is used as means for inhibiting the satellite broadcasting wave from the new satellite from being input to reception/transmission multiplexer 11. However, the radiation selector is not limited to that described above, and can be modified to have a different construction.

FIG. 3 shows another embodiment of this invention. The communication subsystem of this embodiment uses wave absorbers 32c and 32b constituting radiation selector 33. That is, in a case where the satellite broadcasting wave from output switching circuit 30 are inhibited from being input to reception/transmission multiplexer 11, selection switches 31a and 31b pass the satellite broadcasting waves to wave absorbers 32c and 32d so that the waves can be absorbed in the wave absorbers. Other portions corresponding to those in the former embodiment are denoted by the same reference numerals and the explanation there of is omitted. In a case where the radiation selector having wave absorbers 32c and 32d is used, the following advantage can be obtained in comparison with the case where radiators 32a and 32b are used. That is, in a case where radiators 32a and 32b are used, there is a possibility that the satellite broadcasting wave will be transmitted to another artificial satellite. Since, in general, the frequency of waves used for communication between satellites is different from that of the satellite broadcasting wave, no serious problem will occur even when the satellite broadcasting waves are transmitted to another artificial satellite. However, in such a case, the communication of the satellite may be interferred for some reasons. Such a problem can be completely eliminated if the above wave absorbers are used. However, when the wave absorbers are used, heat generation occurs in the wave absorbers, and it becomes necessary to use heat radiation plates. In contrast, if the radiators in the former embodiment are used, it is not necessary to provide a heat radiation plate.

As described above, according to this invention, a communication subsystem for an artificial satellite can be provided in which the operation test for the new satellite can be effected without making the construction complex and causing the interference even when the new satellite is set near the stationary position of the old satellite.

Figure 4:
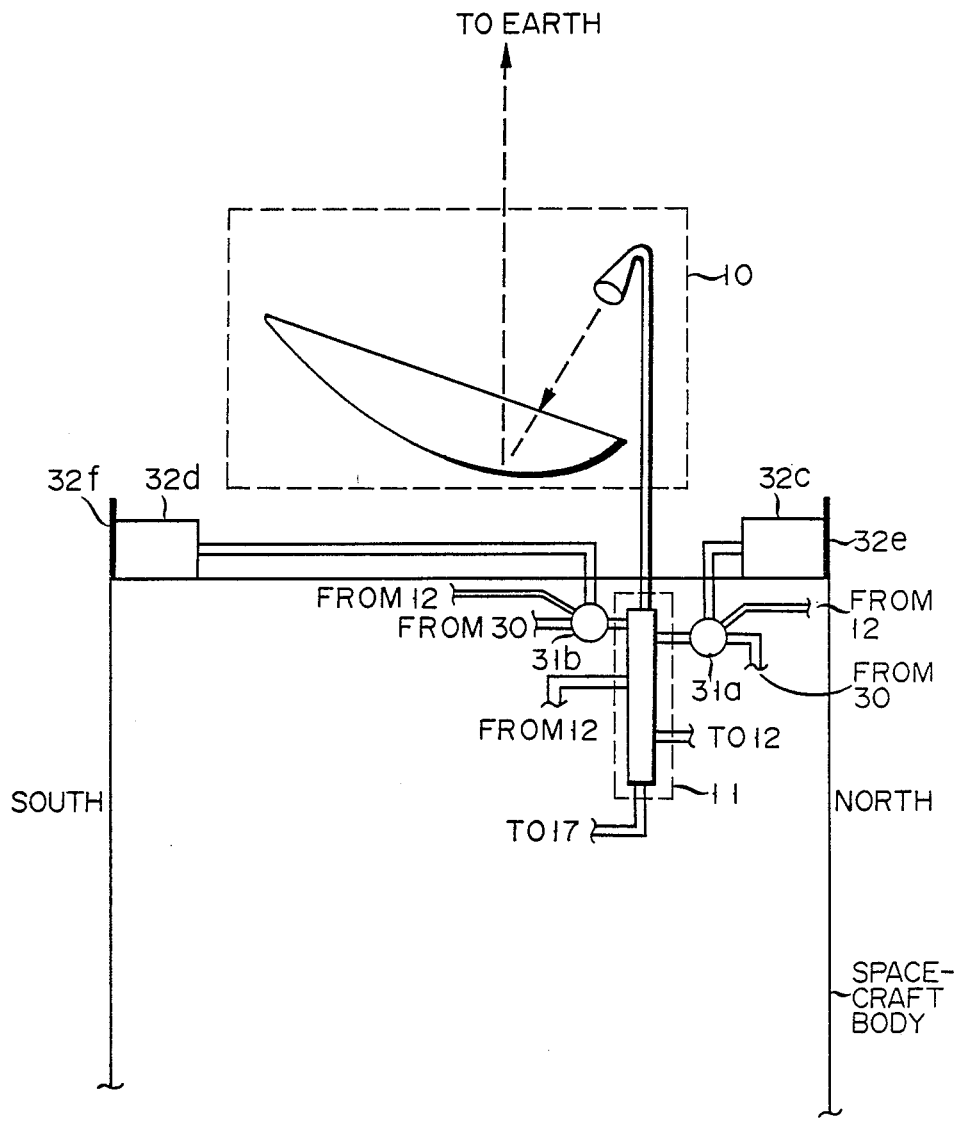
FIG. 4 is an illustrative view showing the arrangement of wave absorbers and an antenna with respect to the main body of the satellite shown in FIG. 3.

FIG. 4 shows the arrangement of wave absorbers 32c and 32d and antenna 10 with respect to the main body of the satellite. The satellite broadcasting wave supplied via output switching circuit 30 is transmitted from antenna 10 towards the earth or absorbed in wave absorbers 32c and 32d.

Wave absorbers 32c and 32d are formed by, for example, coating carbon on or impregnating carbon into the surface of a wedge-shaped plastic body. Wave absorbers 32c and 32d function to convert the wave to heat without reflecting the same. It should be noted that wave absorbers 32c and 32d are provided outside the main body of the satellite in order to efficiently radiate the heat thus converted to the outside of the main body of the satellite. Assuming that the wave absorbers are provided inside the main body of the satellite, then the temperature of peripheral electronic instruments may be raised to an abnormally high temperature and they will be damaged. Heat radiation due to wave absorbers 32c and 32d is basically effected from the north- and south-viewing planes towards the dark space. Therefore, as shown in FIG. 4, heat radiation plates 32e and 32f are provided on the extension of the north- and south-viewing planes, and wave absorbers 32c and 32d are provided in contact with heat radiation plates 32e and 32f, thus attaining effective heat radiation.

The arrangement of wave absorbers 32c and 32d and heat radiation plates 32e and 32f is not limited to the above embodiment. For example, wave absorbers 32c and 32d may be mounted thermally insulatively from the main body of the satellite, and heat radiation plates 32e and 32f may be mounted thermally insulatively from the main body of the satellite.

In a case where the wave absorbers and the heat radiation plates are mounted thermally insulatively from the main body of the satellite (for example, only the waveguides are connected and the main bodies are separated from each other), the following advantages can be obtained. That is, influence of the heat from the wave absorbers on the main body of the satellite can be minimized, and heat radiating means for lowering the temperature of the main body of the satellite may be designed only for the electronic instruments mounted inside the main body of the satellite. The temperature of the heat radiating plate mounted on the wave absorber may be raised to a temperature level (for example, 200° C. below which the wave absorber pair will not become abnormal) relatively higher than the surface temperature (normally 60° C. at maximum for protection of the electronic instruments) of the main body of the satellite, and thus making it possible to efficiently radiate heat. This is because the radiation energy in space varies in proportion to the fourth power of absolute temperature T.

In the above embodiment, it is considered that the satellite broadcasting waves of the new satellite which is to be used instead of the old satellite are irradiated into space or absorbed in the wave absorbers when the operation test for the new satellite is effected. However, such a service condition may also occur in a case other than the case of replacing the satellites. For example, when the picture is disturbed in television broadcasting, it may be preferable for the user that transmission of the satellite broadcasting waves to the service area be stopped and the operation test be effected to determine whether or not the operation of the satellite is normal. In such a case, the operation test is effected by using the telemetry system between the satellite control station and the satellite, and at the same time transmission of the satellite broadcasting waves to the service area is interrupted by means of the radiation selector.

In the above embodiment, it is considered that the satellite broadcasting waves are transmitted towards the ground service area. However, this invention is not limited to this service condition. For example, the satellite broadcasting waves may be transmitted not only towards the earth but also towards another satellite or space station working as the service area in a broad sense. Further, in the above embodiment, the satellite broadcasting wave is used as the wave transmitted to the service area, but it is not limited to the satellite broadcasting wave and the satellite service wave which includes the satellite broadcasting wave in a broad sense can be used.

What is claimed is:

1. A communication subsystem with a capability of performing a non-interfering operational test, comprising:

antenna means for receiving and transmitting radio waves from and to a satellite control station, and directly or indirectly receiving service source radio waves from a broadcasting station and transmitting satellite service radio waves to a service area;

reception/transmission multiplexer means having multiplexing and demultiplexing functions for receiving radio waves from said antenna means at a first input terminal, outputting service source waves and command waves which are separated from the respective received radio waves via first and second output terminals, respectively, and supplying satellite service waves and telemetry waves respectively received at second and third input terminals to said antenna means;

a command reception and telemetry transmission unit for receiving the command waves from the second output terminal and supplying corresponding commands to controlled sections in the satellite, processing telemetry data output from telemeter means inside the satellite to supply the telemetry wave to the third input terminal;

reception/transmission means for receiving the service source wave from the first output terminal, converting the frequency of the service source wave and outputting the converted service source wave as the satellite service wave; and selection means for receiving the satellite service wave from said reception/transmission means, inhibiting the satellite service wave from being supplied to the second input terminal of said reception/transmission multiplexer means in response to a broadcasting instrument test command processed from the command waves while said command reception and telemetry transmission means is receiving the broadcasting instrument test command, and permitting the satellite service wave to be supplied to the second input terminal of said reception/transmission multiplexer means in a case where said command reception and telemetry transmission means does not receive the broadcasting instrument test command.

2. A satellite communication subsystem according to claim 1, wherein said selection means includes switching means and wave radiating means for irradiating radio waves into space in a direction different from that of the service area, and said switching means is operated to pass the satellite service wave to said wave radiating means when the satellite service wave is inhibited from being supplied to the second input terminal of said reception/transmission multiplexer means.

3. A satellite communication subsystem according to claim 1, wherein said selection means includes switching means and wave absorbing means for absorbing radio waves, and said switching means is operated to pass the satellite service wave to said wave absorbing means when the satellite service wave is inhibited from being supplied to the second input terminal of said reception/transmission multiplexer means.

4. A method for testing a satellite located in a satellite orbit, said satellite having means for receiving broadcasting waves transmitted from an earth station; means, including a frequency converting section, for changing the broadcasting waves into satellite broadcasting waves by converting the frequency of the broadcasting waves, means for transmitting the satellite broadcasting waves to a service area via an antenna; means for receiving command waves transmitted from the earth station and for detecting command data from the command waves; and means for supplying the command data to satellite telemetry means to be tested;

wherein, when the satellite telemetry means is being tested, the satellite broadcasting waves are prevented from being supplied to the antenna and are applied to a radiator and radiated into space other than toward the earth, and a result of testing of the satellite telemetry means is transmitted to earth.

5. A method for testing a satellite located in a satellite orbit, said satellite having means for receiving broadcasting waves transmitted from an earth station; means, including a frequency converting section, for changing the broadcasting waves into satellite broadcasting waves by converting the frequency of the broadcasting waves; means for transmitting the satellite broadcasting waves to a service area via an antenna; means for receiving command waves transmitted from the earth station and for detecting command data from the command waves; and means for supplying the command data to satellite telemetry means to be tested;

wherein, when the satellite telemetry means is being tested, the satellite broadcasting waves are prevented from being supplied to the antenna and are absorbed by a wave absorber, and a result of testing of the telemetry means is transmitted to earth.

* * * * *